(12) United States Patent
Huber et al.

(10) Patent No.: US 7,548,150 B2
(45) Date of Patent: Jun. 16, 2009

(54) METHOD FOR THE ALLOCATION OF SHORT ADDRESSES IN ILLUMINATION SYSTEMS

(75) Inventors: Andreas Huber, Traunreut (DE); Gotthard Schleicher, Palling (DE)

(73) Assignee: Osram Gesellschaft mit beschraenkter Haftung, Munich (DE)

(*) Notice: Subject to any disclaimer, the term of this patent is extended or adjusted under 35 U.S.C. 154(b) by 764 days.

(21) Appl. No.: 11/270,543

(22) Filed: Nov. 10, 2005

(65) Prior Publication Data
US 2006/0109203 A1 May 25, 2006

(30) Foreign Application Priority Data
Nov. 19, 2004 (DE) .................. 10 2004 055 933

(51) Int. Cl.
*G05B 23/02* (2006.01)
(52) U.S. Cl. .............. 340/3.5; 340/825.52; 340/825.69; 315/318; 315/312; 315/307; 315/224
(58) Field of Classification Search .................. 340/3.5, 340/3.52, 3.7, 539.11, 825.22, 825.69, 825.52; 315/312, 318, 224, 291, 307, 209 R
See application file for complete search history.

(56) References Cited

U.S. PATENT DOCUMENTS

| | | | | |
|---|---|---|---|---|
| 4,317,624 A * | 3/1982 | Shenk | .................. | 396/61 |
| 4,622,602 A * | 11/1986 | Kutaragi | .................. | 360/48 |
| 4,818,979 A * | 4/1989 | Manson | .................. | 345/536 |
| 5,003,443 A * | 3/1991 | Sabala | .................. | 362/645 |
| 5,327,155 A * | 7/1994 | Olsson et al. | .................. | 345/39 |
| 5,367,355 A * | 11/1994 | Foust | .................. | 396/61 |
| 5,387,908 A * | 2/1995 | Henry et al. | .................. | 340/916 |
| 5,483,155 A * | 1/1996 | Kannegundla et al. | ... | 324/158.1 |
| 5,521,640 A * | 5/1996 | Prater | .................. | 348/273 |
| 5,594,883 A * | 1/1997 | Pricer | .................. | 711/113 |
| 5,612,798 A * | 3/1997 | Tuli | .................. | 349/24 |
| 5,864,713 A * | 1/1999 | Terry | .................. | 710/52 |
| 5,889,501 A * | 3/1999 | Sasaki et al. | .................. | 345/60 |
| 5,983,374 A * | 11/1999 | Todome et al. | .................. | 714/718 |
| 6,348,856 B1 * | 2/2002 | Jones et al. | .................. | 340/10.1 |
| 7,075,253 B2 * | 7/2006 | Huber | .................. | 315/307 |
| 7,391,297 B2 * | 6/2008 | Cash et al. | .................. | 340/3.5 |
| 2003/0020595 A1 | 1/2003 | Wacyk | .................. | 340/3.5 |
| 2004/0184418 A1 * | 9/2004 | Benning et al. | .................. | 370/328 |
| 2004/0232852 A1 * | 11/2004 | Huber | .................. | 315/224 |
| 2004/0232856 A1 * | 11/2004 | Huber | .................. | 315/291 |
| 2006/0044152 A1 * | 3/2006 | Wang | .................. | 340/825 |
| 2006/0109203 A1 * | 5/2006 | Huber et al. | .................. | 345/39 |
| 2006/0125426 A1 * | 6/2006 | Veskovic et al. | .................. | 315/312 |

\* cited by examiner

*Primary Examiner*—Haissa Philogene

(57) ABSTRACT

In a method for the allocation of short addresses in illumination systems, whose illumination components (DALI EB, Lp) are controlled via a DALI bus, the short address is determined and allocated automatically without the intervention of an operator with the aid of a localization device (Tag, 4).

20 Claims, 1 Drawing Sheet

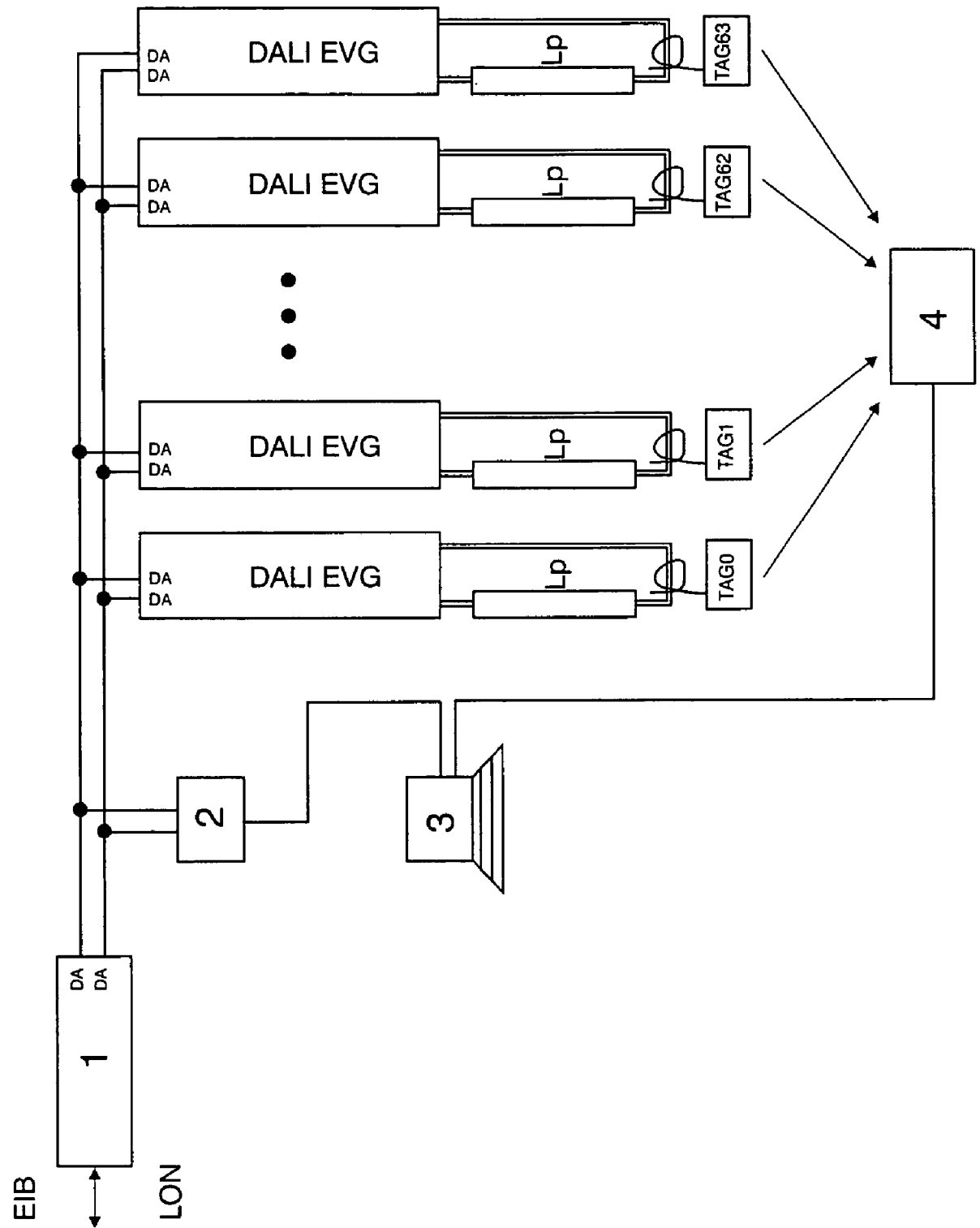

METHOD FOR THE ALLOCATION OF SHORT ADDRESSES IN ILLUMINATION SYSTEMS

FIELD OF THE INVENTION

The invention relates to a method for the allocation of short addresses in illumination systems, whose illumination components are controlled via a DALI bus. DALI is the abbreviation for "digital addressable lighting interface" and means a standardized protocol for the communication of components in an illumination system via a DALI bus.

BACKGROUND OF THE INVENTION

In the simplest case, an illumination system comprises a control device and at least one illumination component, which are connected to one another via a DALI bus.

The control device may have operating elements or be driven by a higher-order control system. Examples of a higher-order control system are so-called building management systems such as EIBs and LONs. The connection to a higher-order control system generally takes place via a so-called gateway.

An illumination component generally contains a light source and an operating device suitable for this purpose, it being possible for the operating device to be controlled by the DALI bus. The light source may be, for example, a fluorescent lamp, a halogen incandescent lamp or a light-emitting diode, and the operating device may be, for example, an electronic operating device or a switched mode power supply.

In order that the control device can control an illumination component, the control device needs to address the illumination component via its long or short address. According to the DALI standard, the long address is 24 bits and the short address is 6 bits long. In an initialization process, which is triggered by the control device, each connected illumination component produces a random long address. Then, the control device searches for all of the long addresses which are provided in the illumination system and stores them.

With most control devices it is possible, inter alia, for illumination settings to be stored and illumination components to be combined to form groups. However, this is only possible with short addresses. The illumination components therefore also need to be allocated short addresses in addition to the long addresses generated by the illumination components themselves. This generally takes place when an illumination system is initially set up. According to the prior art, short addresses are allocated with the aid of a device for short-address allocation in accordance with the following method:

Before a short address can be allocated, the abovementioned long address needs to be generated. All of the illumination components installed in the illumination system are addressed one after the other by their long addresses and instructed by a control command to make themselves noticeable. In the simplest case, the illumination component is switched on. It can be switched on, for example, only for a short period of time or switched on and off a number of times, as a result of which a blinking signal is produced. On the basis of this, an operator establishes which illumination component it is, i.e. where it is located. Thereupon, the operator sets the desired short address using the device for short-address allocation and possibly carries out group assignment.

The method according to the prior art has the following disadvantages: when the system is initially set up, the presence of an operator is always required to allocate the short addresses. With larger systems, this may take several hours. In addition, this method is susceptible to faults since the short addresses need to be input manually.

SUMMARY OF THE INVENTION

One object of the present invention is to specify a method for the location-dependent allocation of short addresses in illumination systems, whose illumination components are controlled via DALI, which method is carried out without an operator.

This object is achieved by the fact that a localization device is provided for carrying out the method, which device is suitable for notifying a device for short-address allocation of the location of an activated illumination component.

As is described in the prior art and in accordance with the DALI standard, each illumination component first of all needs to have a random long address. This is triggered by a DALI command, which is transmitted by the device for short-address allocation. However, the command may also come from any desired control device, which is coupled to the illumination system.

The device for short-address allocation must then receive information relating to the long addresses of all of the illumination components to be provided with short addresses in the illumination system. This information can be acquired automatically by the device for short-address allocation by it determining the long addresses of illumination components via a search algorithm. However, the information can also be determined by another control device and transferred to the device for short-address allocation.

By means of the long address, an illumination component is now induced to output a signal. As described above, this signal may consist in the fact that a lamp of the illumination component lights up. The localization device responds to the signal and derives therefrom the location of the active illumination component. The location essentially comprises the information as to where an illumination component is situated in an area to be illuminated. In general, an illumination scheme is produced for an area to be illuminated. In this scheme, the necessary illumination components are indicated and are provided with a reference. The location is then information regarding which illumination component in the illumination scheme corresponds to a presently active illumination component. An allocation list links the location with a short address. If the location is known using the method according to the invention, the device for short-address allocation allocates a short address with the aid of the allocation list.

The method according to the invention is advantageously developed such that a short address is allocated automatically for a predetermined number of illumination components. In this case, the advantage consists in the fact that all of the short addresses in large illumination systems can be allocated without an operator needing to be present.

The device for short-address allocation can either be connected directly to the DALI bus or to a higher-order control system. If the connection is a direct one to the DALI bus, the allocation of the short addresses is possible independently of the higher-order control system. However, care must be taken that no control commands from the higher-order control system are transmitted during the short-address allocation. If the connection is one via a higher-order control system, the allocation of the short addresses can take place from a central point for an entire building. In this case, two or more illumination systems can also be set in operation at the same time.

The DALI commands required for the allocation of short addresses can be produced by a portable computer. A conventional computer is also suitable for this purpose, and no particular hardware is required. However, an interface is required in order to match external connections of the computer to the DALI bus.

BRIEF DESCRIPTION OF THE DRAWING

The FIGURE is a schematic illustration of a system, with which a method according to the invention can be implemented.

DETAILED DESCRIPTION OF THE INVENTION

The FIGURE illustrates a plurality of DALI EBs, which are connected to a DALI bus via DALI interfaces DA. In each case one lamp Lp is connected to the output of the DALI EBs. For each DALI EB, any desired operating device having a DALI interface DA, which is suitable for a lamp Lp, can be used. A combination comprising a DALI EB and a lamp Lp represents, by way of example, any desired illumination component. In the FIGURE, 4 illumination components are illustrated, separated by dots. This is intended to indicate that other illumination components can also be connected. According to the presently valid DALI standard, a maximum of 64 illumination components are to be distinguished by short addresses.

The gateway 1 is also connected to the DALI bus via a DALI interface DA. A higher-order control system, such as an EIB or LON, gives its control commands to the DALI bus via the gateway 1. The higher-order control system, the DALI bus, the gateway 1 and the illumination components represent, by way of example, the illumination system. If no higher-order control system is provided, the gateway 1 can be replaced by a control device, which controls the illumination system.

A portable computer 3 is connected to the DALI bus via an interface 2. The interface 2 may either contain a dedicated power supply or draw its power from the DALI bus or the computer 3. The portable computer 3 and the interface 2 form the device for short-address allocation. In place of the conventional computer with an interface, hardware which has been developed especially for the purpose of short address allocation may also be used.

A tag is coupled to each lamp circuit of the lamps Lp. The tags are small transmitters, which are fixed to the illumination component and transmit an identification if they are activated. The tags are numbered from 0 to 63. This indicates that 64 tags can be connected to the 64 illumination components possible in accordance with the DALI standard.

As is indicated in the FIGURE, each tag has a sensor wire, which is wound around a lamp terminal or is laid in the vicinity of an electrical conductor through which the lamp current flows. The tag can thus detect a lamp current and therefore identify whether the illumination component is activated by the device for short-address allocation.

It is also possible for the tags not to detect the lamp current but to identify whether the lamp is lit via a light sensor. The tag can thus identify whether the illumination component is activated using special light signals.

The tags are generally fixed to the illumination component such that they can be released. They are suspended on the illumination component using hooks, for example, for the purpose of allocating the short addresses. Fixing using magnets or brackets is also possible. In order to allocate short addresses in identical or similar areas, after completion of the allocation of short addresses in one area, the tags only need to be suspended on a corresponding illumination component in the next area. An allocation list can then be transferred from the preceding area.

In the case of inexpensive tags, it may be expedient in economic terms to connect the tags fixedly to the illumination component or to the operating device. This is particularly applicable when it is difficult to gain access to illumination components.

The tags transmit their identification to a receiver 4. The receiver 4 evaluates the identification and notifies the portable computer 3 of the resulting location. Using the location, the portable computer 3 determines the short address to be allocated via the stored allocation table. The portable computer 3 can now output a DALI command to the DALI bus via the interface 2 for the purpose of allocating the determined short address.

The connection between the tags and the receiver 4 is possible without any complexity in terms of wiring using radio signals. However, it is also conceivable for transmission to take place using wires. In this case, it is advantageous to lay light-sensitive tags on the floor beneath the illumination components.

The power required by the tags for transmitting the identification can originate from different sources. A simple solution is to equip the tags with batteries. In order to avoid exchanging the battery, another power source may advantageously also be used. For example, power can be coupled into the tags from the operating device inductively.

It is also possible for the power to be coupled in via a radiofrequency field. The known RFID (radiofrequency identification) technology can be used for this purpose. The receiver 4 outputs short radio pulses for this purpose, and the relevant tags respond to these radio pulses using the power from them. From the response of the tags, the receiver can conclude which illumination component is activated. It is also possible for a response by the tags to the radio pulses only to be permitted if the illumination component is activated.

One development of the short-address allocation according to the invention consists in the fact that a localization device is designed such that it can allocate a short address directly to the illumination component associated with it. The device for short-address allocation is in this case integrated in the localization device.

The invention claimed is:

1. A method for the allocation of short addresses in illumination systems, whose illumination components (DALI EB, Lp) are controlled via a DALI bus, said method comprising the steps of:

providing a localization device (Tag, 4), which is suitable for notifying a device for short-address allocation (3) of the location of an activated illumination component (DALI EB, Lp), storing an allocation list in the device for short-address allocation (3), which links each location with a short address, allocating random long addresses in the illumination components (DALI EB, Lp), activating an illumination component (DALI EB, Lp) via its long address by the device for short-address allocation (3), outputting a signal by the illumination component (DALI EB, Lp) activated via its long address, triggered by the signal, notifying by the localization device (Tag, 4) the device for short-address allocation (3) of the location of the activated illumination component (DALI EB, Lp), and depending on the notified location, allocating by the device for short-address allocation (3) a short address to the activated illumination component (DALI EB, Lp) using the allocation list.

2. The method as claimed in claim 1, wherein a number of short addresses, which are intended to be allocated by the device for short-address allocation (3), is established, and wherein the following steps are repeated until the established number of short addresses has been allocated:

activating an illumination component (DALI EB, Lp) via its long address by the device for short-address allocation (3), outputting a signal by the illumination component (DALI EB, Lp) activated via its long address, triggered by the signal, notifying by the localization device (Tag, 4) the device for short-address allocation (3) of the location of the activated illumination component (DALI EB, Lp), and depending on the notified location, allocating by the device for short-address allocation (3) a short address to the activated illumination component (DALI EB, Lp) using the allocation list.

3. The method as claimed in claim 1, wherein the device for short-address allocation (3) is connected to the DALI bus or to a building control bus via an interface (2).

4. The method as claimed in claim 1, wherein the device for short-address allocation (3) comprises a portable computer (3).

5. The method as claimed in claim 1, wherein the illumination components (DALI EB, Lp) contain an electronic operating device (DALI EB) and a lamp (Lp).

6. The method as claimed in claim 1, wherein the localization device (Tag, 4) comprises two or more transmitters (Tag) and a receiver (4), each illumination component (DALI EB, Lp) being associated with a transmitter (Tag), which transmits an identification when the illumination component (DALI EB, Lp) is activated, and the receiver (4) identifying which transmitter (Tag) has transmitted, using the identification, whereby the location (Tag, 4) of an activated illumination component (DALI EB, Lp) is established and passed on to the device for short-address allocation (3).

7. A system for allocating short addresses in illumination systems (Tag, 2, 3, 4), with which the method as claimed in claim 1 is carried out.

8. A localization device (Tag, 4) for use in the method as claimed in claim 6, characterized by a transmitter (Tag), which is induced to transmit its identification by a light signal.

9. A localization device (Tag, 4) for use in the method as claimed in claim 6, characterized by a transmitter (Tag), which is induced to transmit its identification by an electrical current flow.

10. A localization device (Tag, 4) for use in the method as claimed in claim 6, characterized by a transmitter (Tag), which draws its power from an electromagnetic field, which is produced by the illumination component (DALI EB, Lp) or the localization device (Tag, 4) itself 11. A localization device (Tag, 4) for use in the method as claimed in claim 6, wherein a transmitter (Tag) is integrated in the illumination component (DALI EB, Lp).

12. A localization device (Tag, 4) for use in the method as claimed in claim 6, wherein a transmitter (Tag) is coupled to the illumination component (DALI EB, Lp) such that it can be released.

13. A device for short-address allocation (3), wherein it evaluates information relating to the location of illumination components (DALI EB, Lp) of the localization device (Tag, 4) as claimed in claim 8 and derives therefrom short addresses for connected illumination components (DALI EB, Lp).

14. The method as claimed in claim 2, wherein the device for short-address allocation (3) is connected to the DALI bus or to a building control bus via an interface (2).

15. A system for allocating short addresses in illumination systems (Tag, 2, 3, 4), with which the method as claimed in claim 2 is carried out.

16. A system for allocating short addresses in illumination systems (Tag, 2, 3, 4), with which the method as claimed in claim 3 is carried out.

17. A system for allocating short addresses in illumination systems (Tag, 2, 3, 4), with which the method as claimed in claim 4 is carried out.

18. A system for allocating short addresses in illumination systems (Tag, 2, 3, 4), with which the method as claimed in claim 5 is carried out.

19. A system for allocating short addresses in illumination systems (Tag, 2, 3, 4), with which the method as claimed in claim 6 is carried out.

20. A device for short-address allocation (3), wherein it evaluates information relating to the location of illumination components (DALI EB, Lp) of the localization device (Tag, 4) as claimed in claim 9 and derives therefrom short addresses for connected illumination components (DALI EB, Lp).

* * * * *